US006950409B1

(12) United States Patent
Kettinger

(10) Patent No.: US 6,950,409 B1
(45) Date of Patent: Sep. 27, 2005

(54) METHOD AND SYSTEM FOR PROVISIONING NON-PREEMPTIBLE UNPROTECTED TRAFFIC IN A BI-DIRECTIONAL RING

(75) Inventor: Jason P. Kettinger, Plano, TX (US)

(73) Assignee: Fujitsu Limited, Kawasaki (JP)

(*) Notice: Subject to any disclaimer, the term of this patent is extended or adjusted under 35 U.S.C. 154(b) by 833 days.

(21) Appl. No.: 09/846,161

(22) Filed: Apr. 30, 2001

(51) Int. Cl.[7] .............................................. H04L 12/28
(52) U.S. Cl. ..................................... 370/258; 370/400
(58) Field of Search ................................ 370/223, 225, 370/227, 228, 242, 247, 248, 249, 252, 254, 370/258, 400, 401, 403, 404, 405, 406

(56) References Cited

U.S. PATENT DOCUMENTS

| 5,406,401 | A | * | 4/1995 | Kremer ....................... 370/224 |
| 5,434,863 | A | * | 7/1995 | Onishi et al. ................ 370/402 |
| 5,815,490 | A | * | 9/1998 | Lu ............................... 370/223 |
| 6,680,912 | B1 | * | 1/2004 | Kalman et al. ............. 370/238 |
| 6,751,660 | B1 | * | 6/2004 | Mansingh et al. .......... 370/236 |
| 2003/0031126 | A1 | * | 2/2003 | Mayweather et al. ....... 370/223 |

OTHER PUBLICATIONS

Bellcore, "*SONET Bidirectional Line-Switched Ring Equipment Generic Criteria,*", A Module of TSGR, RF-440, Generic Requirements, GR-1230-Core, Issue 4, Dec. 1998.

* cited by examiner

*Primary Examiner*—Chi Pham
*Assistant Examiner*—Anh-Vu H Ly
(74) *Attorney, Agent, or Firm*—Baker Botts L.L.P.

(57) ABSTRACT

A method for provisioning non-preemptible unprotected traffic (NUT) in a bi-directional ring is provided. The ring includes a plurality of nodes. Each node includes a local NUT table that is operable to store NUT provisioning data for the node. The method includes distributing a master NUT table to each of the nodes. The master NUT table comprises NUT provisioning data for the ring. The master NUT table is verified at each of the nodes. The NUT provisioning data in the master NUT table is stored in the local NUT table at each of the nodes when the master NUT table is verified by every node.

27 Claims, 7 Drawing Sheets

FIG. 7

| K1 BYTE | | | K2 BYTE | | |
|---|---|---|---|---|---|
| BITS 1-4 | DESCRIPTION | | BITS 1-4 | | SOURCE NODE ID |
| | | | BIT 5 | | SHORT OR LONG PATH REQUEST INDICATION |
| | | | BITS 6-8 | | DESCRIPTION |
| 1111 | LOCKOUT OF PROTECTION (LOP) | | | 111 | LINE AIS |
| 1110 | SEND NUT BYTE #1 | | | 110 | LINE RDI |
| 1101 | FORCED SWITCH (FS-R) | | | 101 | LINE LDI (LOCAL DEFECT INDICATION) |
| 1100 | SEND NUT BYTE #2 | | | 100 | INVALID (RESERVED) |
| 1011 | SIGNAL FAILURE (SF-R) | | | 011 | EXTRA TRAFFIC |
| 1010 | SEND NUT BYTE #3 | | | 010 | BRIDGED AND SWITCHED (BR&SW) |
| 1001 | START/FINALIZE REQUEST | | | 001 | BRIDGED (BR) |
| 1000 | SIGNAL DEGRADE (SD-R) | | | 000 | IDLE |
| 0111 | ACKNOWLEDGE NUT BYTE #1 | | NUT K2 | | NUT TABLE DATA FOR SEND/ACK #1-3 |
| 0110 | MANUAL SWITCH (MS-R) | | FINALIZE | | K2 = PQRX XXX0 (SEE BELOW FOR PQR) |
| 0101 | WAIT TO RESTORE (WTR) | | START | | K2 = XXXX XXX1 |
| 0100 | ACKNOWLEDGE NUT BYTE #2 | | | | P = PARITY OF FIRST BYTE OF NUT TABLE |
| 0011 | EXERCISER (EXER-R) | | | | Q = PARITY OF SECOND BYTE |
| 0010 | ACKNOWLEDGE NUT BYTE #3 | | | | R = PARITY OF THIRD BYTE |
| 0001 | REVERSE REQUEST (RR-R) | | | | |
| 0000 | NO REQUEST (NR) | | | | |
| BITS 5-8 | DESTINATION NODE ID | | | | |

METHOD AND SYSTEM FOR PROVISIONING NON-PREEMPTIBLE UNPROTECTED TRAFFIC IN A BI-DIRECTIONAL RING

TECHNICAL FIELD OF THE INVENTION

This invention relates generally to the field of communication networks and more particularly to a method and system for provisioning non-preemptible unprotected traffic in a bi-directional ring.

BACKGROUND OF THE INVENTION

Conventional communication networks often provide communication paths between source and destination network elements that include bi-directional line-switched rings. In these rings, traffic is provided in both directions to allow for protection of traffic in the event of a failure. These rings support working traffic and protection traffic.

Working traffic, which is provided through regular channels in one direction around the ring, has corresponding back-up channels for protection in the opposite direction such that the working traffic may be carried through a back-up channel in the event of a failure in the corresponding regular channel. Protection traffic is provided through the back-up channels such that, in the event of a failure for the working traffic, the protection traffic is pre-empted by the working traffic which has priority to use the back-up channels for protection.

Bi-directional line-switched rings may also support non-preemptible unprotected traffic (NUT). NUT is traffic that is provided either through a regular channel or through a back-up channel and that is neither protected nor pre-empted by a failure. Thus, using NUT, a failure in the channel carrying the traffic results in a loss of the transmission of the traffic through the ring. However, a failure in a corresponding channel does not pre-empt the NUT. With NUT on a regular channel, therefore, additional NUT may be provided through the corresponding protection channel, resulting in a doubling of available bandwidth for that traffic.

Because NUT provisioning is traditionally accomplished locally and independently at each node in the ring, reliable use of non-preemptible unprotected traffic through a bi-directional line-switched ring is limited by the NUT provisioning capabilities of every node that is a part of or is later added to the ring, as well as by the NUT provisioning performed independently at each of these nodes, which must be identical.

Thus, in order to carry non-preemptible unprotected traffic reliably through the ring, each node in the ring must be capable of provisioning the traffic channels as non-preemptible unprotected traffic. If even a single node in the ring is incapable of NUT provisioning, non-preemptible unprotected traffic may not be carried reliably by the ring due to the use of protection channels for that traffic which would be pre-empted during a failure. Similarly, each node in the ring must provide identical NUT provisioning of the channels. If even a single node in the ring provisions the channels differently, traffic misconnections may occur during protection switches.

SUMMARY OF THE INVENTION

The present invention provides an improved method and system for provisioning non-preemptible unprotected traffic (NUT) in a bi-directional ring that substantially eliminate or reduce disadvantages and problems associated with previous systems and methods. In particular, a master NUT table indicating which channels are provisioned as NUT channels is communicated to every node in the ring, each node verifies the provisioning in the master NUT table, and each node updates its local NUT table with the master NUT table after every node has verified the master NUT table.

In accordance with one embodiment of the present invention, a method for provisioning non-preemptible unprotected traffic (NUT) in a bi-directional ring is provided. The ring includes a plurality of nodes. Each node includes a local NUT table that is operable to store NUT provisioning data for the node. The method includes distributing a master NUT table to each of the nodes. The master NUT table comprises NUT provisioning data for the ring. The master NUT table is verified at each of the nodes. The NUT provisioning data in the master NUT table is stored in the local NUT table at each of the nodes when the master NUT table is verified by every node.

In accordance with another embodiment of the present invention, a bi-directional ring operable to provision non-preemptible unprotected traffic (NUT) is provided. The ring comprises a plurality of nodes, including a provisioning node, at least one intermediate node, and a destination node. The provisioning node is operable to distribute a master NUT table to each of the nodes and to receive an acknowledgement of the master NUT table. The master NUT table comprises NUT provisioning data for the ring. The intermediate node is operable to receive the master NUT table and the acknowledgement. The intermediate node is also operable to pass the master NUT table and the acknowledgement around the ring. The destination node is operable to receive the master NUT table and to send the acknowledgement around the ring.

Technical advantages of one or more embodiments the present invention include providing an improved method for NUT provisioning in a bi-directional ring. In a particular embodiment, a master NUT table is communicated to every node in the ring, each node verifies the provisioning in the master NUT table, and each node updates its local NUT table with the master NUT table after every node has verified the master NUT table. The master NUT table is not verified if any node in the ring is incapable of providing NUT provisioning or if any node in the ring determines that the integrity of the master NUT table as an identical table for each node has been compromised. As a result, before NUT provisioning is completed for the ring, each node in the ring is confirmed as NUT-capable and is confirmed to have identical provisioning of the traffic channels. Accordingly, non-preemptible unprotected traffic may be carried reliably through a bi-directional ring, which doubles bandwidth with regard to the NUT-provisioned traffic.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 7 is a table illustrating K-bytes operable to allow NUT provisioning for the nodes in the ring of FIG. 1 in accordance with one embodiment of the present invention.

DETAILED DESCRIPTION OF THE INVENTION

Figure 1:
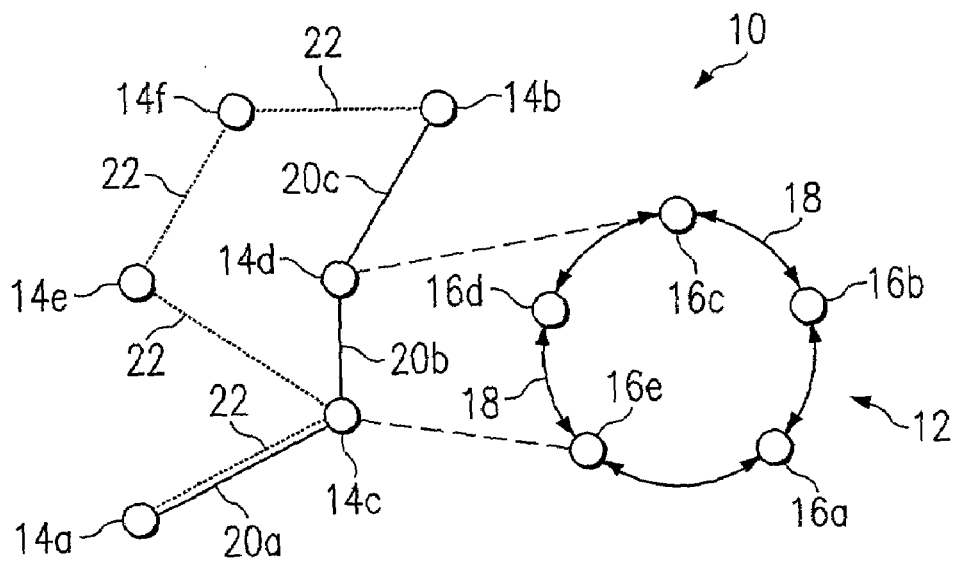
FIG. 1 is a block diagram illustrating a communication network including a bi-directional ring in which non-preemptible unprotected traffic (NUT) is provisioned in accordance with one embodiment of the invention.

FIG. 1 is a block diagram illustrating a communication network 10 comprising a bi-directional ring 12 in which non-preemptible unprotected traffic is provisioned in accordance with one embodiment of the invention. The communication network 10 transmits audio, video, data, and other suitable types of information and/or a combination of different types of information between remote locations. The communication network 10 may comprise any suitable wireline or wireless system, or combination thereof, operable to support communication between various network elements. For example, the network 10 may comprise a public switched telephone network, an integrated services digital network, a local area network, a wide area network, a global computer network, such as the Internet or other dedicated switched network, or other communication system or combination of communication systems at one or more locations.

Referring to FIG. 1, the communication network 10 comprises a plurality of network elements 14. The network elements 14 are operable to communicate traffic in the communication network 10. The network elements 14 may comprise a switch, router, add/drop multiplexer or other suitable device capable of directing traffic in the communication network 10.

The ring 12 may comprise a bi-directional line-switched ring or other suitable bi-directional ring. The ring 12 comprises a plurality of nodes 16 which may or may not correspond to the network elements 14. For example, in accordance with the illustrated embodiment, the network elements 14c and 14d correspond to the nodes 16e and 16c, respectively, while the nodes 16a, 16b and 16d do not correspond to a network element 14.

The ring 12 is operable to provide protection for working traffic in the ring 12 in the event of a failure between two of the nodes 16. Although the embodiment shown includes five nodes 16, it will be understood that the ring 12 may comprise any suitable number of nodes 16 without departing from the scope of the present invention. In accordance with one embodiment, the nodes 16 comprise FLASH 600 network elements manufactured by FUJITSU NETWORK COMMUNICATIONS, INC.

The nodes 16 of the ring are interconnected by communication links 18. The communication links 18 may provide a physical interface between the nodes 16. The physical interface is defined by the bandwidth of the communication links 18 which may be DS-3 links, OC-3 lines, OC-12 lines or any other suitable types of lines having similar or other bandwidths. The communication links 18 may comprise optical fiber, cable, twisted wire, or other suitable wireline or wireless link capable of transporting traffic between two nodes 16.

In accordance with the ring architecture, a working stream of traffic is provided between the nodes 16 in one direction, while a redundant protection traffic stream is available between the nodes 16 in the opposite direction. Thus, the ring 12 may support at least three types of traffic: working traffic which will be protected in the event of a failure, protection traffic which may be dropped in order to handle working traffic from failed channels, and non-preemptible unprotected traffic which is neither protected nor dropped.

In operation, the network 10 may comprise data traffic originating at a source network element 14a to be delivered to a destination network element 14b. The data traffic may be originally routed along path 20. Thus, the data traffic may travel from the network element 14a along line 20a to the network element 14c, along line 20b to the network element 14d, and along line 20c to the destination network element 14b.

In the illustrated embodiment, if a failure occurs along line 20b or line 20c, the data traffic may be re-routed along path 22. In this situation, the data traffic may travel from the source network element 14a to the network element 14c, followed by the network element 14e and the network element 14f, before arriving at the destination network element 14b. It will be understood that the data traffic may be provided from the source network element 14a to the destination network element network 14b along a plurality of different paths through a plurality of different network elements 14. Thus, for this type of traffic which may be re-routed, a failure along line 20b will not prevent the traffic from reaching the destination network element 14b.

Thus, for the embodiment illustrated in FIG. 1 in which the line 20b comprises a bi-directional line-switched ring 12, data traffic which may be re-routed may comprise non-preemptible unprotected traffic through the ring 12. This is because a failure between nodes 16 carrying the data traffic through the ring 12 does not need to be protected in order to ensure that the data traffic reaches the destination network element 14b, as previously described.

Figure 2:
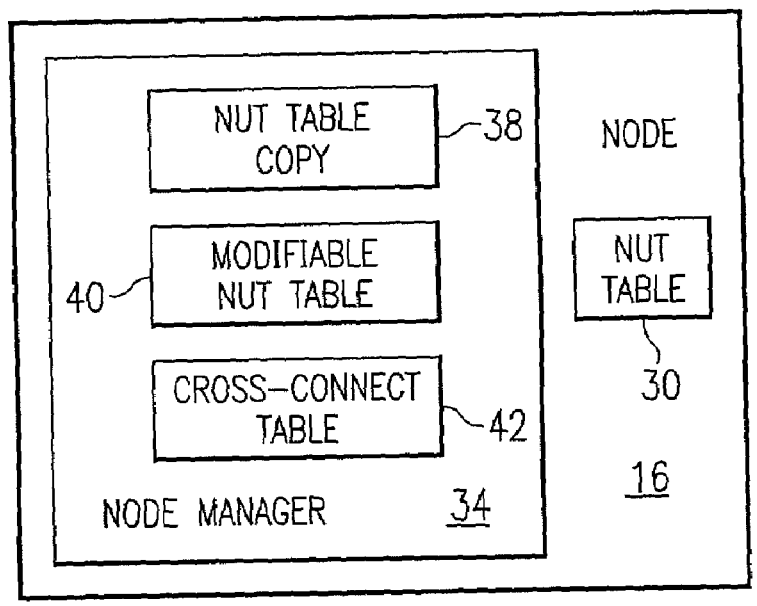
FIG. 2 is a block diagram illustrating details of a node of FIG. 1 in accordance with one embodiment of the present invention.

FIG. 2 is a block diagram illustrating details of a node 16 in accordance with one embodiment of the present invention. The node 16 comprises a NUT table 30 that is operable to specify which channels carry non-preemptible unprotected traffic and a node manager 34 that is operable to provide management functions for the node 16 and to store data for the node 16. The NUT table 30 may also be operable to specify which channels do not carry non-preemptible unprotected traffic.

According to one embodiment, the NUT table 30 is implemented in hardware such as registers or other suitable hardware, and the node manager 34 is implemented in software. However, it will be understood that the NUT table 30 and the node manager 34 may be otherwise suitably implemented without departing from the scope of the present invention. For example, the NUT table 30 and the node manager 34 may comprise logic encoded in media. The logic comprises functional instructions for carrying out program tasks. The media comprises computer disks or other computer-readable media, application-specific integrated circuits, field-programmable gate arrays, digital signal processors, other suitable specific or general purpose processors, transmission media or other suitable media in which logic may be encoded and utilized.

In accordance with one embodiment, the node manager 34 comprises a NUT table copy 38, a modifiable NUT table 40, and a cross-connect table 42. The NUT table copy 38 comprises a copy of the information stored in the NUT table 30. For example, the NUT table copy 38 may comprise a software copy of data stored in a hardware-implemented NUT table 30. Thus, for this example, the hardware-implemented NUT table 30 may be used in operation, while the software-implemented NUT table copy 38 may be used for comparison with the modifiable NUT table 40, as described in more detail below.

The modifiable NUT table 40 comprises the information stored in either the NUT table 30 or the NUT table copy 38, with or without modifications. Thus, for example, the modifiable NUT table 40 may be generated by copying data from either the NUT table 30 or the NUT table copy 38. The modifiable NUT table 40 may then be modified to update NUT provisioning for the node 16. The modifiable NUT table 40 may then be distributed around the ring 12 and verified by each node 16. If an updated modifiable NUT table 40 is verified by each node 16, the modifiable NUT table 40 may be written to the NUT table 30 of each node 16. Thus, each node 16 in the ring 12 will have an identical NUT table 30.

The cross-connect table 42 comprises information regarding which channels of traffic through the node 16 are concatenated. Thus, while each node 16 in the ring 12 is verifying a modifiable NUT table 40 before updating its NUT table 30, the NUT provisioning in the modifiable NUT table 40 may be compared to the cross-connect provisioning in the cross-connect table 42 to ensure that NUT functionality is not segmented across concatenated traffic. If the NUT provisioning in the modifiable NUT table 40 indicates that a first channel is non-preemptible unprotected traffic and a second channel is working traffic, while the cross-connect provisioning in the cross-connect table 42 indicates that the first channel, the second channel and a third channel are concatenated, the modifiable NUT table 40 will not be verified. This prevents partial provisioning which prevents misconnections to concatenated traffic during a failure.

Figure 3A:
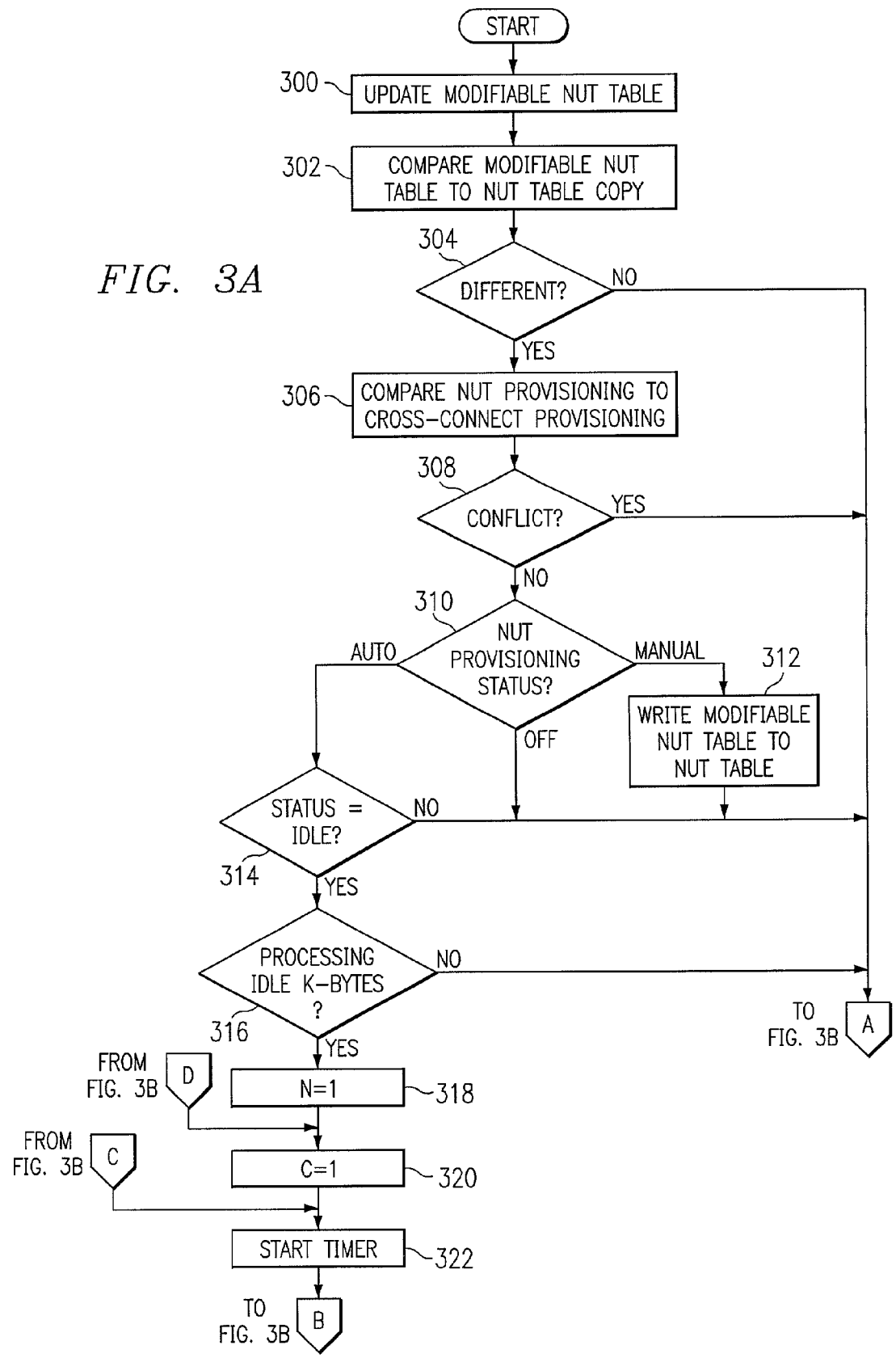
FIG. 3 is a flow diagram illustrating a method for NUT provisioning from the perspective of a provisioning node of FIG. 1 in accordance with one embodiment of the present invention.
Figure 3B:
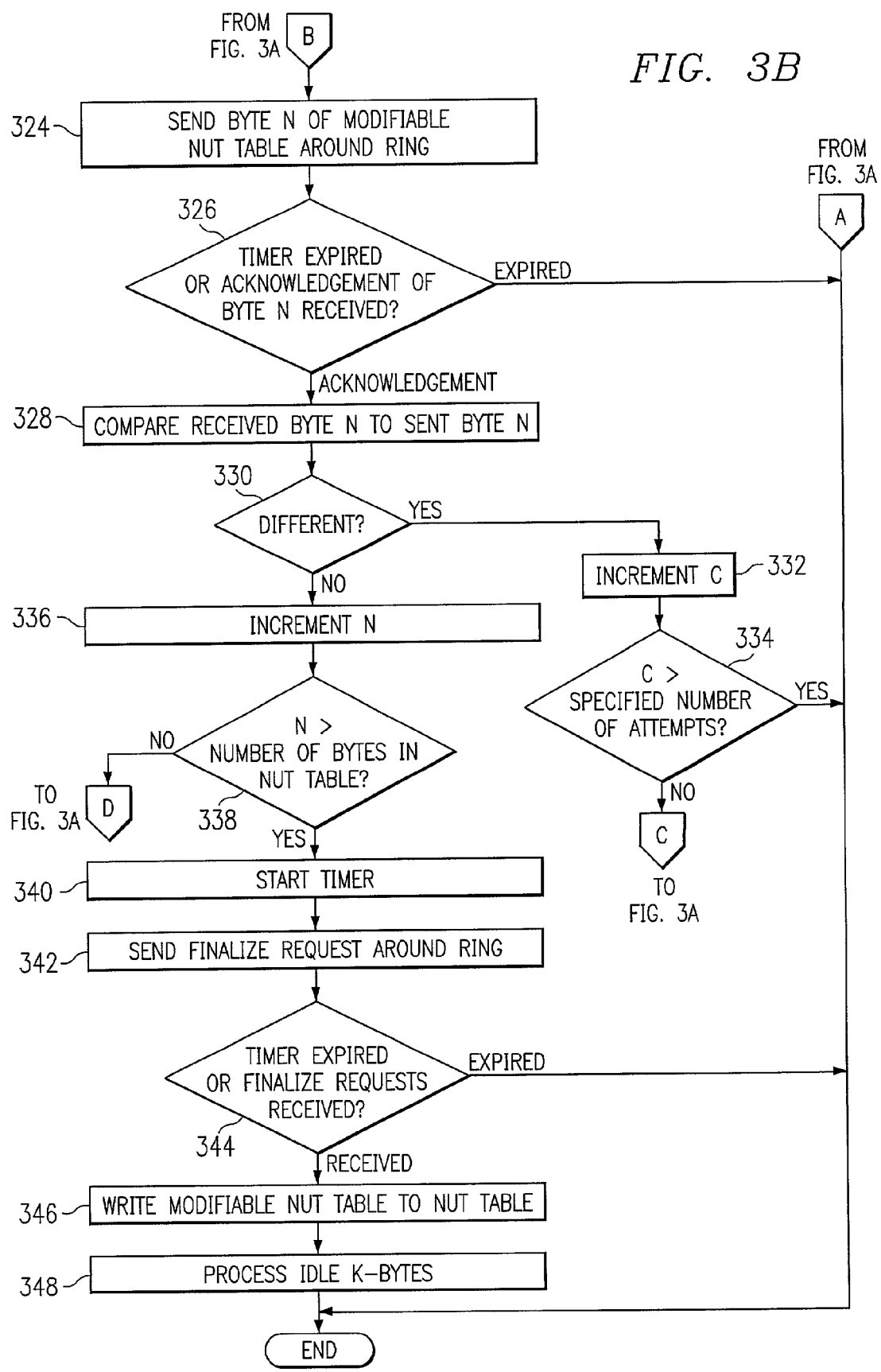

FIG. 3 is a flow diagram illustrating a method for NUT provisioning from the perspective of a provisioning node 16 in accordance with one embodiment of the present invention. A provisioning node 16 comprises a node 16 that is operable to distribute its modifiable NUT table 40 as a master NUT table around the ring 12. In accordance with the embodiment described below, the node 16a is considered to be a provisioning node 16. However, it will be understood that any of the nodes 16 may comprise a provisioning node 16. For example, a provisioning node 16 may comprise a node 16 that is first to receive a new modifiable NUT table 40 from a user or a newly-activated node 16.

The method begins at step 300 where the provisioning node 16a updates its modifiable NUT table 40 based on user input, automatically triggered provisioning, or other indication of a possible change for the NUT table 30. At step 302, the provisioning node 16a compares the modifiable NUT table 40 to the NUT table copy 38.

At decisional step 304, a determination is made regarding whether the modifiable NUT table 40 is different from the NUT table copy 38. If no difference exists, the method follows the No branch from decisional step 304 and comes to an end because no update is necessary. However, if a difference does exist, the method follows the Yes branch from decisional step 304 to step 306.

At step 306, the provisioning node 16a compares the NUT provisioning of the modifiable NUT table 40 to the cross-connect provisioning in the cross-connect table 42 to ensure that NUT functionality is not segmented across concatenated traffic. At decisional step 308, the provisioning node 16a determines whether a conflict exists between the NUT provisioning and the cross-connect provisioning. If a conflict does exist, the method follows the Yes branch from decisional step 308 and comes to an end. However, if there is no conflict, the method follows the No branch from decisional step 308 to decisional step 310.

At decisional step 310, the NUT provisioning status of the ring 12 is determined. If the NUT provisioning status of the ring 12 is off, the method follows the Off branch from decisional step 310 and comes to an end. If the NUT provisioning status of the ring 12 is manual, the method follows the Manual branch from decisional step 310 to step 312. At step 312, the provisioning node 16a writes the modifiable NUT table 40 to the NUT table 30 for the provisioning node 16a, at which point the method comes to an end.

Returning to decisional step 310, if the NUT provisioning status of the ring 12 is automatic, the method follows the Auto branch from decisional step 310 to the decisional step 314. At decisional step 314, the provisioning node 16a determines whether its status is idle. A status of idle may indicate that no failures have resulted in a protection switch for traffic channels being processed by the node 16a. If the status of the provisioning node 16a is not idle, the method follows the No branch and comes to an end. Thus, the NUT provisioning is not performed during failure conditions. However, if the status of the provisioning node 16a is idle, the method follows the Yes branch from decisional step 314 to step 316.

At step 316, the provisioning node 16a makes a determination regarding whether the provisioning node 16a is processing idle K-bytes. K-bytes comprise specified header bytes as defined by the BELLCORE GR-1230 standard. Although the described embodiment refers to K-bytes, it will be understood that other suitable header or other in-band bytes may be used without departing from the scope of the present invention.

If the provisioning node 16a is not processing idle K-bytes or other bytes used for NUT provisioning, the method follows the No branch from decisional step 316 and comes to an end. However, if the provisioning node 16a is processing idles K-bytes, the method follows the Yes branch from decisional step 316 to step 318.

At step 318, a segment indicator, N, for the modifiable NUT table 40 is set to 1. Each segment comprises a part of the modifiable NUT table 40. In one embodiment, the modifiable NUT table 40 is sent in three segments. According to one embodiment, each segment comprises a byte. However, it will be understood that the segments may comprise any other suitable portion of data without departing from the scope of the present invention. At step 320, an attempt counter, C, is set to 1 in order to keep track of multiple attempts at sending a same segment of the modifiable NUT table 40 around the ring 12.

At step 322, the provisioning node 16a starts a timer for the current attempt. At step 324, the provisioning node 16a sends byte N of the modifiable NUT table 40 around the ring 12 in both directions. Thus, for the embodiment illustrated in FIG. 1, the provisioning node 16a sends byte N to node 16b and node 16e.

At decisional step 326, the provisioning node 16a determines whether the timer has expired or an acknowledgment of byte N was received. If the timer expired before an acknowledgment was received, the method follows the Expired branch from decisional step 326 and comes to an end. However, if an acknowledgment of byte N was received before the timer expired, the method follows the ACK branch from decisional step 326 to step 328.

At step 328, the provisioning node 16a compares the byte N received in the acknowledgment to the byte N that was sent around the ring 12 to ensure that the integrity of the modifiable NUT table 40 being distributed around the ring 12 has not been compromised. At decisional step 330, the provisioning node 16a determines whether a difference exists between the received byte and the sent byte. If a difference exists, the data has been compromised and the method follows the Yes branch from decisional step 330 to step 332.

At step 332, the attempt counter, C, is incremented to indicate an unsuccessful attempt. At decisional step 334, the provisioning node 16a determines whether C is greater than a specified number of attempts for sending a byte around the ring 12. According to one embodiment, the specified number of attempts may comprise four attempts. However, it will be understood that any suitable number of attempts may be specified without departing from the scope of the present invention.

If C is greater than the specified number of attempts, the method follows the Yes branch from decisional step 334 and comes to an end. However, if C is not greater than the specified number of attempts, the method follows the No branch from decisional step 334 and returns to step 322 where the timer is started for another attempt at sending byte N around the ring 12.

Returning to decisional step 330, if the provisioning node 16a found no difference between the byte N received in the acknowledgment and the byte N sent around the ring 12, the method follows the No branch from decisional step 330 to step 336. At step 336, the segment indicator, N, is incremented.

At decisional step 338, the provisioning node 16a determines whether N is greater than the number of bytes, or other suitable segments, in the NUT table 30. For example, for a NUT table 30 comprising three bytes of data with each segment comprising a byte, the provisioning node 16a determines whether N is greater than three. If N is not greater than the number of bytes in the NUT table 30, the method follows the No branch and returns to step 320 where the attempt counter, C, is reset to 1 for the first attempt to send the next byte around the ring 12.

However, if N is greater than the number of bytes in the NUT table 30, the entire modifiable NUT table 40 has been successfully sent around the ring and the method follows the Yes branch from decisional step 338 to step 340. At step 340, the provisioning node 16a starts a timer for finalizing the distribution of the modifiable NUT table 40.

At step 342, the provisioning node 16a sends a finalize request around the ring 12 in both directions. Thus, for the embodiment illustrated in FIG. 1, the provisioning node 16a sends the finalize request to node 16b and node 16e. At decisional step 344, the provisioning node 16a determines whether the timer has expired or whether finalize requests have been received by the provisioning node 16a in both directions of the ring 12. If the timer has expired before both finalize requests are received from nodes 16b and 16e, the method follows the Expired branch from decisional step 344 and comes to an end.

However, if both finalize requests have been received from node 16b and node 16e before the timer expired, the method follows the Received branch from decisional step 344 to step 346. At step 346, the provisioning node 16a writes the modifiable NUT table 40 to the NUT table 30 for the provisioning node 16a. At this point, the provisioning node 16a may also copy the NUT table 30 to the NUT table copy 38. At step 348, the provisioning node 16a returns to processing idle K-bytes, and the method comes to end.

Figure 4:
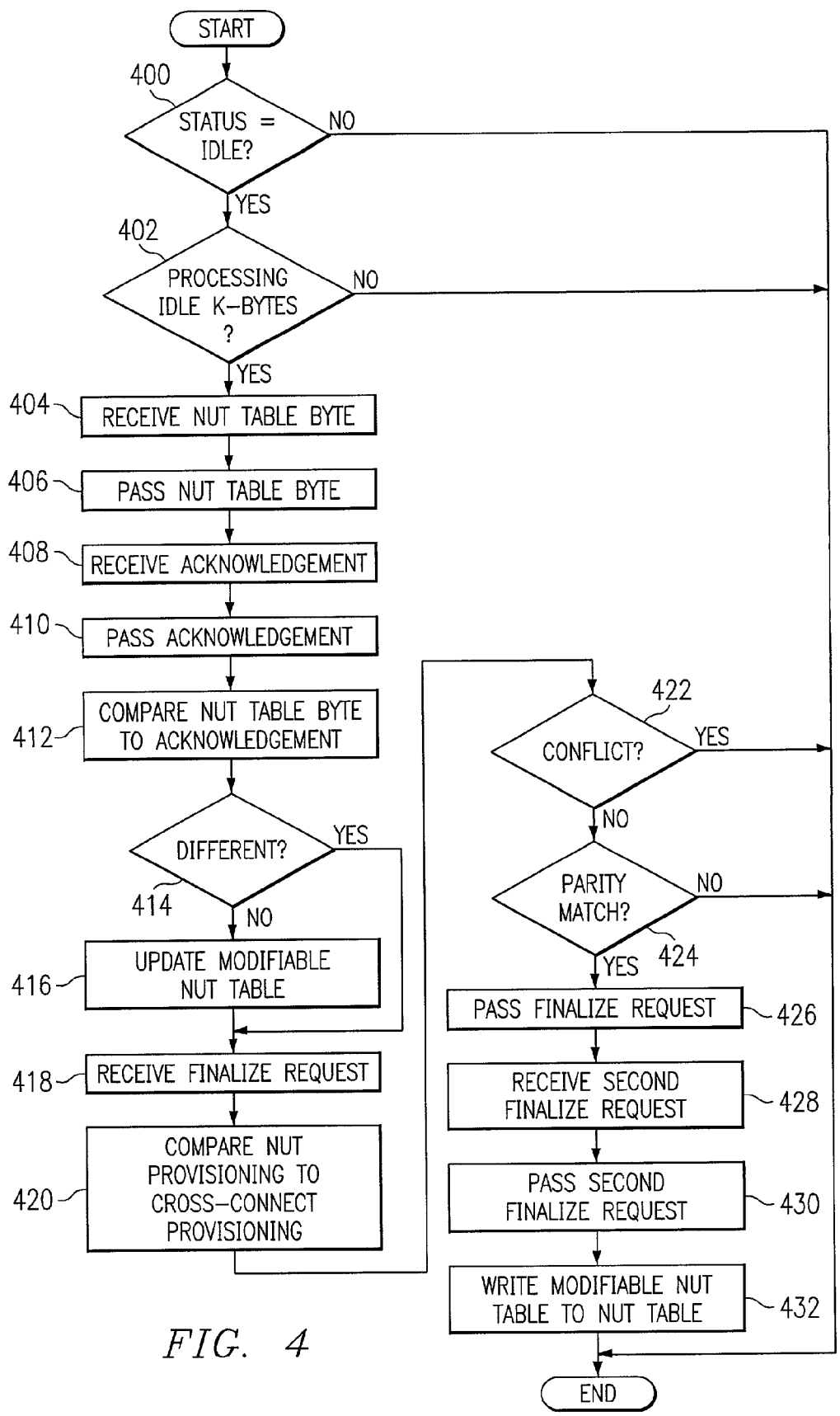
FIG. 4 is a flow diagram illustrating a method for NUT provisioning from the perspective of an intermediate node of FIG. 1 in accordance with one embodiment of the present invention.

FIG. 4 is a flow diagram illustrating a method for NUT provisioning from the perspective of an intermediate node 16 in accordance with one embodiment of the present invention. An intermediate node 16 comprises a node 16 that is operable to pass a master NUT table around the ring 12. The intermediate nodes 16 may comprise nodes 16 other than the provisioning node 16 and the destination node 16, which is described in more detail below in connection with FIG. 5. In accordance with the embodiment described below, the nodes 16b–d are considered to be intermediate nodes 16. However, it will be understood that any of the nodes 16 may comprise intermediate nodes 16.

The method begins at step 400 where the intermediate node 16b–d determines whether its status is idle. If the status of the intermediate node 16b–d is not idle, the method follows the No branch from decisional step 400 and comes to an end. However, if the status of the intermediate node 16b–d is idle, the method follows the Yes branch from decisional step 400 to decisional step 402.

At decisional step 402, the intermediate node 16b–d determines whether or not the intermediate node 16b–d is processing idle K-bytes. If the intermediate node 16b–d is not processing idle K-bytes, the method follows the No branch from decisional step 402 and comes to an end. However, if the intermediate node 16b–d is processing idle K-bytes, the method follows the Yes branch from decisional step 402 to step 404.

At step 404, the intermediate node 16b–d receives a NUT table byte, or other suitable segment of the modifiable NUT table 40, from the provisioning node 16a. The NUT table byte may be received directly from the provisioning node 16a or may be received from another intermediate node 16b–d. At step 406, the intermediate node 16b–d passes the NUT table byte to an adjacent node 16 other than the node 16 from which the NUT table byte was received in step 404. Thus, for the embodiment illustrated in FIG. 1, the intermediate node 16b passes the NUT table byte to the intermediate node 16c if the NUT table byte was received from the provisioning node 16a.

At step 408, the intermediate node 16b–d receives an acknowledgment of the NUT table byte from the adjacent node 16 to which the intermediate node 16b–d passed the NUT table byte in step 406. At step 410, the intermediate node 16b–d passes the acknowledgment to the adjacent node 16 from which the NUT table byte was received in step 404. Thus, for example, the intermediate node 16b receives the acknowledgment from node 16c in step 408 and passes the acknowledgment to the provisioning node 16a in step 410.

At step 412, the intermediate node 16b–d compares the NUT table byte received in step 404 with the NUT table byte in the acknowledgment received in step 408. At decisional step 414, the intermediate node 16b–d determines whether a difference exists between the compared NUT table bytes. If no difference exists between the NUT table bytes, the method follows the No branch from decisional step 414 to step 416. At step 416, the intermediate node 16b–d updates its modifiable NUT table 40 with the NUT table byte. In accordance with the embodiment in which the modifiable NUT table 40 comprises three bytes, the method may repeat steps 404–416 twice more for the second and third bytes. The method then continues to step 418.

Returning to decisional step 414, if a difference is found between the NUT table bytes, the method follows the Yes branch from decisional step 414 to step 418. At step 418, the intermediate node 16b–d receives a finalize request. At step 420, the intermediate node 16b–d compares the NUT provisioning in the modifiable NUT table 40 to the cross-connect provisioning in the cross-connect table 42 to ensure that NUT functionality is not segmented across concatenated traffic.

At decisional step 422, the intermediate node 16b–d determines whether a conflict exists between the NUT provisioning and the cross-connect provisioning. If a conflict exists, the method follows the Yes branch from decisional step 422 and comes to end. However, if no conflict exists, the method follows the No branch from decisional step 422 to decisional step 424.

At decisional step 424, the intermediate node 16b–d determines whether the parity bits of the modifiable NUT table 40 match the parity bits in the finalize request to ensure that the integrity of the modifiable NUT table 40 being distributed around the ring 12 has not been compromised. If the parity bits do not match, the method follows the No branch from decisional step 424 and comes to an end. However, if the parity bits match, the method follows the Yes branch from decisional step 424 to step 426.

At step 426, the intermediate node 16b–d passes the finalize request to an adjacent node 16 other than the node 16 from which the finalize request was received in step 418. At step 428, the intermediate node 16b–d receives a second finalize request from the opposite direction in the ring 12. At step 430, the intermediate node 16b–d passes the second finalize request to the adjacent node 16 other than the node 16 from which the second finalize request was received in step 428. At step 432, the intermediate node 16b–d writes the modifiable NUT table 40 to the NUT table 30 for the intermediate node 16b–d, and the method comes to an end.

Figure 5:
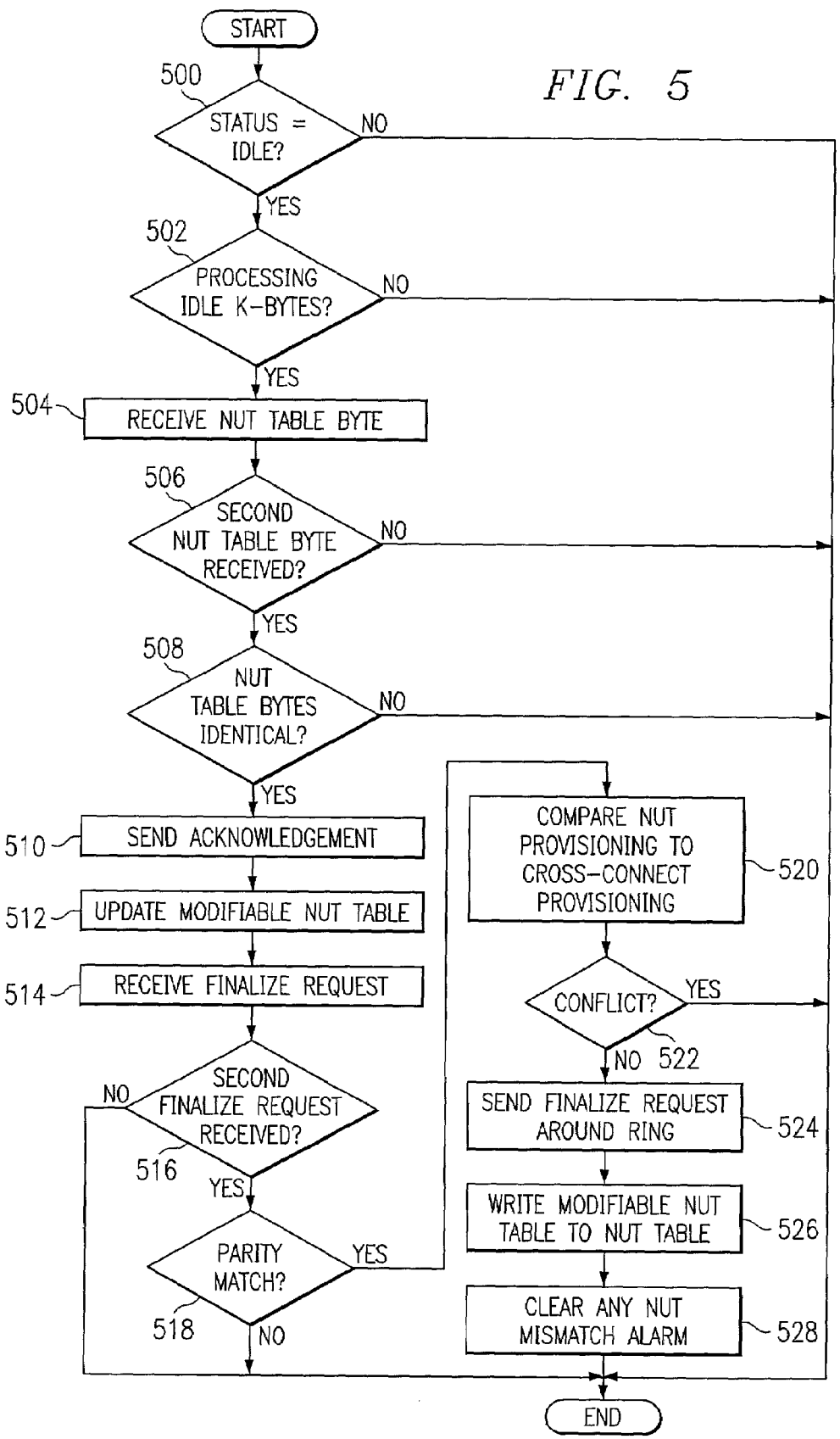
FIG. 5 is a flow diagram illustrating a method for NUT provisioning from the perspective of a destination node of FIG. 1 in accordance with one embodiment of the present invention.

FIG. 5 is a flow diagram illustrating a method for NUT provisioning from the perspective of a destination node 16 in accordance with one embodiment of the present invention. A destination node 16 comprises a node 16 that is operable to receive a master NUT table and to provide an acknowledgement of the receipt of the master NUT table. The destination node 16 may comprise the clockwise adjacent node 16 to the provisioning node 16 or may be otherwise suitably identified. For example, the destination node 16 may comprise the node 16 furthest from the provisioning node 16 in the direction of the traffic. In accordance with the embodiment described below, the node 16e is considered to be a destination node 16. However, it will be understood that any of the nodes 16 may comprise a destination node 16.

The method begins at step 500 where the destination node 16e determines whether its status is idle. If the status of the destination node 16e is not idle, the method follows the No branch from decisional step 500 and comes to an end. However, if the status of the destination node 16e is idle, the method follows the Yes branch from decisional step 500 to decisional step 502.

At decisional step 502, the destination node 16e determines whether or not the destination node 16e is processing idle K-bytes. If the destination node 16e is not processing idle K-bytes, the method follows the No branch from decisional step 502 and comes to an end. However, if the destination node 16e is processing idle K-bytes, the method follows the Yes branch from decisional step 502 to step 504.

At step 504, the destination node 16e receives a NUT table byte, or other suitable segment of the modifiable table 40, from the provisioning node 16a. At decisional step 506, the destination node 16e determines whether or not the destination node 16e has received a second NUT table byte. If the destination node 16e has not received a second NUT table byte within a specified period of time, the method follows the No branch from decisional step 506 and comes to an end. However, if the destination node 16e has received a second NUT table byte, the method follows the Yes branch from decisional step 506 to decisional step 508.

At decisional step 508, the destination node 16e determines whether or not the two received NUT table bytes are identical to ensure that the integrity of the modifiable NUT table 40 being distributed around the ring 12 has not been compromised. If the NUT table bytes are not identical, the method follows the No branch from decisional step 508 and comes to an end. However, if the NUT table bytes are identical, the method follows the Yes branch from decisional step 508 to step 510.

At step 510, the destination node 16e sends an acknowledgment of the NUT table byte around the ring 12 in both directions. Thus, for the embodiment illustrated in FIG. 1, the destination node 16e sends an acknowledgment of the NUT table byte to the intermediate node 16d and to the provisioning node 16a. At step 512, the destination node 16e updates the modifiable NUT table 40 for the destination node 16e with the NUT table byte. In accordance with the embodiment in which the modifiable NUT table 40 comprises three bytes, the method may repeat steps 504–512 twice more for the second and third bytes.

At step 514, the destination node 16e receives a finalize request. At decisional step 516, the destination node 16e determines whether or not a second finalize request was received by the destination node 16e. If a second finalize request was not received, the method follows the No branch from decisional step 516 and comes to an end. However, if a second finalize request was received by the destination node 16e, the method follows the Yes branch from decisional step 516 to decisional step 518.

At decisional step 518, the destination node 16e determines whether the parity bits of the modifiable NUT table 40 match the parity bits in the finalize request to ensure that the integrity of the modifiable NUT table 40 being distributed around the ring 12 has not been compromised. If the parity bits do not match, the method follows the No branch from decisional step 518 and comes to an end. However, if the parity bits match, the method follows the Yes branch from decisional step 518 to step 520.

At step 520, the destination node 16e compares the NUT provisioning in the modifiable NUT table 40 to the cross-connect provisioning in the cross-connect table 42 to ensure NUT functionality is not segmented across concatenated traffic. At decisional step 522, the destination node 16e determines whether or not a conflict exists between the NUT provisioning and the cross-connect provisioning. If a conflict exists, the method follows the Yes branch from decisional step 522 and comes to an end. However, if there is no conflict, the method follows the No branch from decisional step 522 to step 524.

At step 524, the destination node 16e sends the finalize request around the ring 12 in both directions. Thus, for the embodiment illustrated in FIG. 1, the destination node 16e sends the finalize request to the intermediate node 16d and the provisioning node 16a. At step 526, the destination node 16e writes the modifiable NUT table 40 to the NUT table 30 for the destination node 16e. At step 528, the destination node 16e clears any NUT mismatch alarm that may have been raised by an initiating node 16 as described in more detail below in connection with FIG. 6, at which point the method comes to an end.

In this way, the modifiable NUT table 40 for the provisioning node 16a may be distributed as a master NUT table to every node 16 in the ring 12, each node 16 may verify the provisioning in the master NUT table, and each node 16 may updates its local NUT table 30 with the master NUT table after every node 16 has verified the master NUT table.

In addition, if any node 16 in the ring 12 is incapable of providing NUT provisioning or if any node 16 in the ring 12 determines that the integrity of the master NUT table has been compromised, the master NUT table is not verified. Thus, before NUT provisioning is finalized for the ring 12, each node 16 is confirmed as NUT-capable and has identical provisioning of the traffic channels. This results in the ability to reliably provide non-preemptible unprotected traffic through the ring 12, which doubles bandwidth with regard to the NUT-provisioned traffic.

Figure 6:
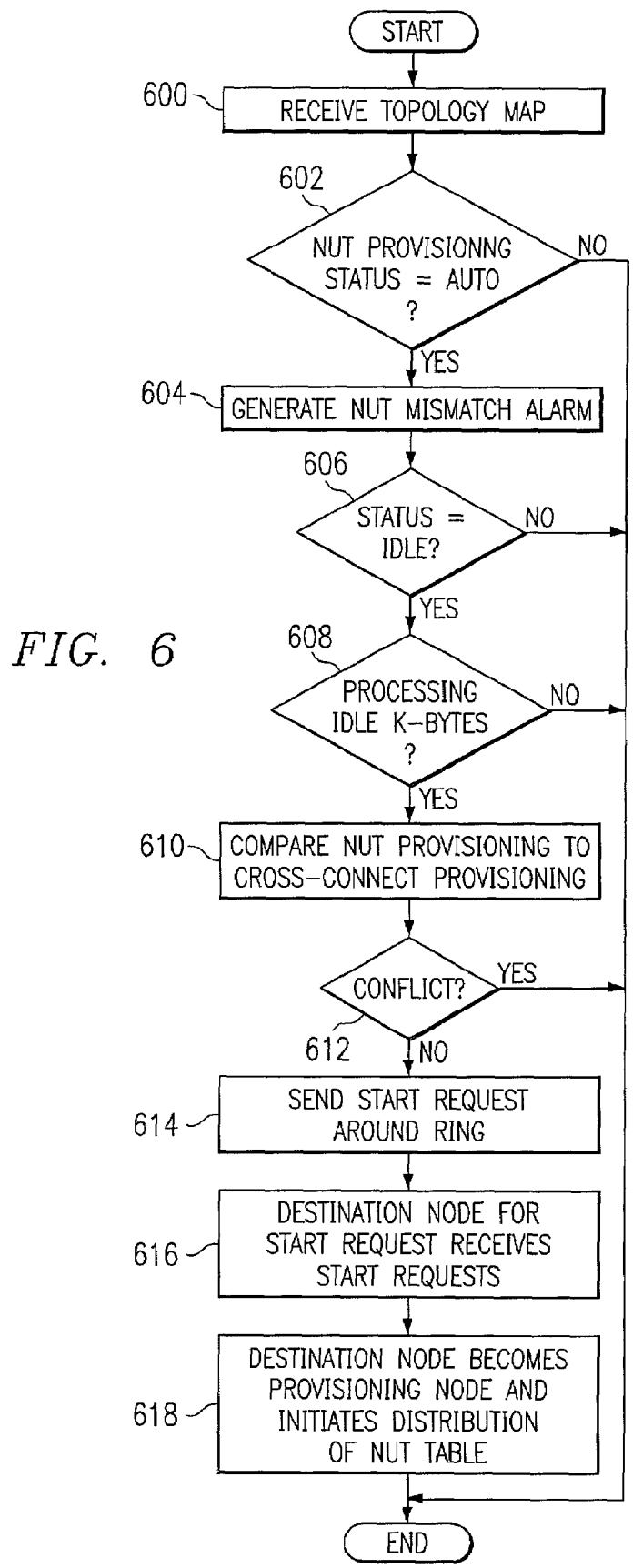
FIG. 6 is a flow diagram illustrating a method for NUT provisioning from the perspective of an initiating node of FIG. 1 in accordance with one embodiment of the present invention.

FIG. 6 is a flow diagram illustrating a method for NUT provisioning from the perspective of an initiating node 16 in accordance with one embodiment of the present invention. An initiating node 16 comprises a node 16 in the ring 12 that loses its provisioning or is powered down, a node 16 that is newly added to the ring 12, or a node 16 in other suitable circumstances that result in the node 16 needing to verify NUT provisioning for the ring 12. These types of nodes 16 may initiate the distribution of a master NUT table around the ring 12. In accordance with the embodiment described below, the node 16c is considered to be an initiating node 16. However, it will be understood that any of the nodes 16 may comprise an initiating node 16.

The method begins at step 600 where the initiating node 16c receives a topology map for the ring 12. At decisional step 602, the initiating node 16c determines whether the NUT provisioning status of the ring 12 is automatic. If the NUT provisioning status of the ring 12 is not automatic, the method follows the No branch from decisional step 602 and comes to an end. However, if the NUT provisioning status of the ring 12 is automatic, the method follows the Yes branch from decisional step 602 to step 604.

At step 604, the initiating node 16c generates a NUT mismatch alarm for the ring 12. At decisional step 606, the initiating node 16c determines whether or not its status is idle. If the status of the initiating node 16c is not idle, the method follows the No branch from decisional step 606 and comes to an end. However, if the status of the initiating node 16c is idle, the method follows the Yes branch from decisional step 606 to decisional step 608.

At decisional step 608, the initiating node 16c determines whether or not the initiating node 16c is processing idles K-bytes. If the initiating node 16c is not processing idle K-bytes, the method follows the No branch from decisional step 608 and comes to an end. However, if the initiating node 16c is processing idle K-bytes, the method follows the Yes branch from decisional step 608 to step 610.

At step 610, the initiating node 16c compares the NUT provisioning in its modifiable NUT table 40 to the cross-connect provisioning in its cross-connect table 42 to ensure that NUT functionality is not segmented across concatenated traffic. At decisional step 612, the initiating node 16c determines whether or not a conflict exists between the NUT provisioning and the cross-connect provisioning. If a conflict exists, the method follows the Yes branch from decisional step 612 and comes to an end. However, if there is no conflict, the method follows the No branch from decisional step 612 to step 614.

At step 614, the initiating node 16c sends a start request around the ring 12 in both directions. Thus, for the embodiment illustrated in FIG. 1, the initiating node 16c sends a start request to the node 16b and the node 16d. At step 616, the destination node 16 for the start request, which may comprise the clockwise adjacent node 16b, receives the start request from the initiating node 16c in both directions. Thus, the node 16b receives the start request from the initiating node 16c and from the node 16a.

At step 618, the node 16b becomes a provisioning node 16 and initiates distribution of its modifiable NUT table 40 around the ring 12 as described above in connection with FIG. 3, at which the point the method comes to an end. In this way, any node 16 in the ring 12 that loses its provisioning or is powered down or any node 16 that is newly added to the ring 12 may initiate the distribution of a master NUT table around the ring 12.

FIG. 7 is a table 700 illustrating K-bytes 702 and 704 operable to allow NUT provisioning for the nodes 16 in the ring 12 in accordance with one embodiment of the present invention. The K-bytes 702 and 704 each comprise a specified format in accordance with the GR-1230 standard defined by BELLCORE for a 2-fiber bi-directional line-switched ring 12.

In accordance with one embodiment of the present invention, the distribution of the NUT table bytes, the acknowledgments, the finalize request, and the start request described in the methods of FIGS. 3–6 may be provided through the K1 byte 702 and the K2 byte 704. However, it will be understood that this information may be distributed through other suitable header bytes without departing from the scope of the present invention. Thus, using these byes 702 and 704, a master NUT table may be distributed around the ring 12 through existing line overhead, as described above in connection with FIGS. 3–6.

The K1 byte 702 is operable to identify the type of information being communicated between the nodes 16, while the K2 byte 704 comprises the actual information. As illustrated in the table 700, the K1 byte 702 comprises an information identifier 710 in the form of the first four bits of the K1 byte 702. The K1 byte 702 also comprises a destination node identifier 714 in the form of the last four bits of the K1 byte 702.

For an exemplary embodiment, the NUT table 30 comprises three bytes of data and the ring 12 comprises a 2-fiber bi-directional line-switched ring 12. According to this embodiment, the K1 byte 702 comprises seven unused values in the GR-1230 standard that may be used for NUT provisioning. Thus, in accordance with the illustrated embodiment, if the first four bits of the K1 byte 702 comprise 1010, the corresponding data in the K2 byte 704 comprises the third NUT table byte. Similarly, if the first four bits of the K1 byte 702 comprise 1001, the data in the K2 byte 704 comprises a start or finalize request. It will be understood that the information identifiers 710 corresponding to each of the NUT table bytes, the acknowledgments, the start request, and the finalize request may be assigned in any pre-defined order other than the order illustrated in FIG. 7 without departing from the scope of the present invention.

The K2 byte 704 comprises a standard format 716 for use when the K2 byte 704 corresponds to a standard K1 byte 702 that is unrelated to NUT provisioning. The K2 byte 704 also comprises a NUT provisioning format 718 for use when the K1 byte 702 comprises NUT provisioning information. The standard format 716 comprises a source node identifier 720 in the form of the first four bits of the K2 byte 704, a short or long path request indicator 722 in the form of the fifth bit of the K2 byte 704, and an information identifier 724 in the form of the last three bits of the K2 byte 704.

The K2 byte 704 comprises NUT provisioning data in the NUT provisioning format 718 when a modifiable NUT table 40 is being distributed around the ring 12. The NUT provisioning format 718 of the K2 byte 704 comprises NUT table bytes 730 for K1 bytes 702 comprising a send or acknowledge request and comprises finalize data 732 or start data 734 for K1 bytes 702 comprising a finalize or start request.

In accordance with the illustrated embodiment, the last bit of the K2 byte 704 for a finalize request is a zero, while the last bit of the K2 byte 704 for a start request is a one. However, it will be understood that the finalize data 732 and the start data 734 may be otherwise suitably differentiated without parting from the scope of the present invention.

The finalize data 732 also comprises three bits of parity information corresponding to the three bytes of the modifiable NUT table 40 which is being distributed around the ring 12. In the illustrated embodiment, these three bits are the first three bits of the K2 byte 704. However, it will be understood that the parity bits may comprise any suitable bits in the K2 byte 704 without departing from the scope of the present invention. In addition, according to the illustrated embodiment, the fourth through the seventh bits of the K2 byte 704 are unused for the finalize data 732, and the first seven bits of the K2 byte 704 are unused for the start data 734.

Although the present invention has been described with several embodiments, various changes and modifications may be suggested to one skilled in the art. It is intended that the present invention encompass such changes and modifications as fall within the scope of the appended claims.

What is claimed is:

1. A method for provisioning non-preemptible unprotected traffic (NUT) in a bi-directional ring, the ring comprising a plurality of nodes, each node comprising a local NUT table operable to store NUT provisioning data for the node and a cross-connect table operable to store cross-connect provisioning data for the node, comprising:
   distributing a master NUT table to each of the nodes, the master NUT table comprising NUT provisioning data for the ring;
   verifying the master NUT table at each of the nodes, wherein verifying the master NUT table comprises:
      comparing the NUT provisioning data in the master NUT table to the cross-connect provisioning data in the cross-connect table; and
      rejecting the master NUT table as unverified when the NUT provisioning data conflicts with the cross-connect provisioning data; and
   storing in the local NUT table at each of the nodes the NUT provisioning data in the master NUT table when the master NUT table is verified by every node.

2. The method of claim 1, further comprising:
   receiving the master NUT table at each node from a first direction and from a second direction; and
   verifying the master NUT table at each of the nodes comprising comparing the NUT provisioning data in the master NUT table received in the first direction to the NUT provisioning data in the master NUT table received in the second direction and rejecting the master NUT table as unverified when the NUT provisioning data received in the first direction conflicts with the NUT provisioning data received in the second direction.

3. The method of claim 1, further comprising:
   receiving the master NUT table at each node from a first direction and from a second direction; and
   verifying the master NUT table at each of the nodes comprising comparing parity data for the NUT provisioning data in the master NUT table received in the first direction to parity data for the NUT provisioning data in the master NUT table received in the second direction and rejecting the master NUT table as unverified when the parity data for the NUT provisioning data received in the first direction conflicts with the parity data for the NUT provisioning data received in the second direction.

4. The method of claim 1, further comprising receiving the master NUT table at each node from a first direction and from a second direction, and verifying the master NUT table at each of the nodes comprising:
   comparing the NUT provisioning data in the master NUT table to the cross-connect provisioning data in the cross-connect table;
   comparing the NUT provisioning data in the master NUT table received in the first direction to the NUT provisioning data in the master NUT table received in the second direction;
   comparing parity data for the NUT provisioning data in the master NUT table received in the first direction to parity data for the NUT provisioning data in the master NUT table received in the second direction; and
   rejecting the master NUT table as unverified when the NUT provisioning data conflicts with the cross-connect provisioning data, when the NUT provisioning data received in the first direction conflicts with the NUT provisioning data received in the second direction, or when the parity data for the NUT provisioning data received in the first direction conflicts with the parity data for the NUT provisioning data received in the second direction.

5. The method of claim 4, verifying the master NUT table at each of the nodes further comprising accepting the master NUT table as verified when the NUT provisioning data matches the cross-connect provisioning data, the NUT provisioning data received in the first direction matches the NUT provisioning data received in the second direction, and the parity data for the NUT provisioning data received in the first direction matches the parity data for the NUT provisioning data received in the second direction.

6. The method of claim 1, further comprising:
   sending a start request to a provisioning node; and
   distributing a master NUT table to each of the nodes comprising distributing the master NUT table from the provisioning node to each of the nodes when the start request is received by the provisioning node.

7. The method of claim 1, the ring comprising a 2-fiber bi-directional line-switched ring, distributing a master NUT table to each of the nodes comprising distributing the master NUT table through header bytes.

8. A node for a bi-directional ring comprising a plurality of nodes, comprising:
   a local non-preemptible unprotected traffic (NUT) table operable to store NUT provisioning data for the node; and
   a node manager comprising a cross-connect table operable to store cross-connect provisioning data for the node, the node manager operable to receive a master NUT table, the master NUT table comprising NUT provisioning data for the ring, to verify the master NUT table by comparing the NUT provisioning data in the master NUT table to the cross-connect provisioning data in the cross-connect table and to reject the master NUT table as unverified when the NUT provisioning data conflicts with the cross-connect provisioning data, to communicate with other nodes in the ring to determine verification of the master NUT table by the other nodes, and to store in the local NUT table the NUT provisioning data in the master NUT table when the master NUT table is verified by the node and when verification by the other nodes is determined.

9. The node of claim 8, the node manager further operable to receive the master NUT table from a first direction and from a second direction and to verify the master NUT table by comparing the NUT provisioning data in the master NUT table received in the first direction to the NUT provisioning data in the master NUT table received in the second direction and rejecting the master NUT table as unverified when the NUT provisioning data received in the first direction conflicts with the NUT provisioning data received in the second direction.

10. The node of claim 8, the node manager further operable to receive the master NUT table from a first direction and from a second direction and to verify the master NUT table by comparing parity data for the NUT provisioning data in the master NUT table received in the first direction to parity data for the NUT provisioning data in the master NUT table received in the second direction and rejecting the master NUT table as unverified when the parity data for the NUT provisioning data received in the first direction conflicts with the parity data for the NUT provisioning data received in the second direction.

11. The node of claim 8, the node manager further operable to receive the master NUT table from a first direction and from a second direction and to verify the master NUT table by comparing the NUT provisioning data in the master NUT table to the cross-connect provisioning data in the cross-connect table, comparing the NUT provisioning data in the master NUT table received in the first direction to the NUT provisioning data in the master NUT table received in the second direction, comparing parity data for the NUT provisioning data in the master NUT table received in the first direction to parity data for the NUT provisioning data in the master NUT table received in the second direction, and rejecting the master NUT table as unverified when the NUT provisioning data conflicts with the cross-connect provisioning data, when the NUT provisioning data received in the first direction conflicts with the NUT provisioning data received in the second direction, or when the parity data for the NUT provisioning data received in the first direction conflicts with the parity data for the NUT provisioning data received in the second direction.

12. The node of claim 11, the node manager further operable to verify the master NUT table by accepting the master NUT table as verified when the NUT provisioning data matches the cross-connect provisioning data, the NUT provisioning data received in the first direction matches the NUT provisioning data received in the second direction, and the parity data for the NUT provisioning data received in the first direction matches the parity data for the NUT provisioning data received in the second direction.

13. The node of claim 8, the node manager further operable to send a start request to a provisioning node in the ring, the start request comprising a request for the provisioning node to distribute a master NUT table to each of the nodes in the ring.

14. The node of claim 8, the ring comprising a 2-fiber bi-directional line-switched ring, the node manager further operable to receive the master NUT table through header bytes.

15. A system for provisioning non-preemptible unprotected traffic (NUT) in a node of a bi-directional ring, comprising:
a computer-processable medium; and
logic stored on the computer-processable medium, the logic operable to store NUT provisioning data for the node in a local NUT table and to store cross-connect provisioning data for the node in a cross-connect table, to receive a master NUT table, the master NUT table comprising NUT provisioning data for the ring, to verify the master NUT table by comparing the NUT provisioning data in the master NUT table to the cross-connect provisioning data in the cross-connect table and to reject the master NUT table as unverified when the NUT provisioning data conflicts with the cross-connect provisioning data, to communicate with other nodes in the ring to determine verification of the master NUT table by the other nodes, and to store in the local NUT table the NUT provisioning data in the master NUT table when the master NUT table is verified by the node and when verification by the other nodes is determined.

16. The system of claim 15, the logic further operable to receive the master NUT table from a first direction and from a second direction and to verify the master NUT table by comparing the NUT provisioning data in the master NUT table received in the first direction to the NUT provisioning data in the master NUT table received in the second direction and rejecting the master NUT table as unverified when the NUT provisioning data received in the first direction conflicts with the NUT provisioning data received in the second direction.

17. The system of claim 15, the logic further operable to receive the master NUT table from a first direction and from a second direction and to verify the master NUT table by comparing parity data for the NUT provisioning data in the master NUT table received in the first direction to parity data for the NUT provisioning data in the master NUT table received in the second direction and rejecting the master NUT table as unverified when the parity data for the NUT provisioning data received in the first direction conflicts with the parity data for the NUT provisioning data received in the second direction.

18. The system of claim 15, the logic further operable to to receive the master NUT table from a first direction and from a second direction, and to verify the master NUT table by comparing the NUT provisioning data in the master NUT table to the cross-connect provisioning data in the cross-connect table, comparing the NUT provisioning data in the master NUT table received in the first direction to the NUT provisioning data in the master NUT table received in the second direction, comparing parity data for the NUT provisioning data in the master NUT table received in the first direction to parity data for the NUT provisioning data in the master NUT table received in the second direction, and rejecting the master NUT table as unverified when the NUT provisioning data conflicts with the cross-connect provisioning data, when the NUT provisioning data received in the first direction conflicts with the NUT provisioning data received in the second direction, or when the parity data for the NUT provisioning data received in the first direction conflicts with the parity data for the NUT provisioning data received in the second direction.

19. The system of claim 18, the logic further operable to verify the master NUT table by accepting the master NUT table as verified when the NUT provisioning data matches the cross-connect provisioning data, the NUT provisioning data received in the first direction matches the NUT provisioning data received in the second direction, and the parity data for the NUT provisioning data received in the first direction matches the parity data for the NUT provisioning data received in the second direction.

20. The system of claim 15, the logic further operable to send a start request to a provisioning node, the start request comprising a request for the provisioning node to distribute a master NUT table to each of the nodes in the ring.

21. The system of claim 15, the ring comprising a 2-fiber bi-directional line-switched ring, the logic further operable to receive the master NUT table through header bytes.

22. A bi-directional ring operable to provision non-preemptible unprotected traffic (NUT) and comprising a plurality of nodes, the ring comprising:
    a provisioning node operable to distribute a master NUT table to each of the nodes and to receive an acknowledgement of the master NUT table, the master NUT table comprising NUT provisioning data for the ring;
    at least one intermediate node operable to receive the master NUT table and the acknowledgement and to pass the master NUT table and the acknowledgement around the ring; and
    a destination node operable to receive the master NUT table and to send the acknowledgement around the ring;
    wherein each node comprises a cross-connect table operable to store cross-connect provisioning data for the node and wherein each node is operable to verify the master NUT table by comparing the NUT provisioning data in the master NUT table to the cross-connect provisioning data in the cross-connect table.

23. The ring of claim 22, each node comprising a local NUT table operable to store NUT provisioning data for the node, and wherein:
    the provisioning node is operable to verify the master NUT table based on the distributed master NUT table and the received acknowledgment;
    the intermediate node is operable to verify the master NUT table based on the received master NUT table and the received acknowledgment;
    the destination node is operable to receive the master NUT table from a first direction and from a second direction and to verify the master NUT table based on the master NUT table received in the first direction and the master NUT table received in the second direction; and
    each node is operable to store in the local NUT table for the node the NUT provisioning data in the master NUT table when the master NUT table is verified by every node.

24. The ring of claim 22, further comprising an initiating node, the initiating node operable to send a start request to the provisioning node, the provisioning node further operable to distribute the master NUT table to each of the nodes in the ring when the start request is received.

25. The ring of claim 22, the provisioning node further operable to distribute the master NUT table to each of the nodes through header bytes.

26. The ring of claim 22, each node operable to receive the master NUT table from a first direction and from a second direction and to verify the master NUT table by comparing the NUT provisioning data in the master NUT table to the cross-connect provisioning data in the cross-connect table, comparing the NUT provisioning data in the master NUT table received in the first direction to the NUT provisioning data in the master NUT table received in the second direction, comparing parity data for the NUT provisioning data in the master NUT table received in the first direction to parity data for the NUT provisioning data in the master NUT table received in the second direction, and rejecting the master NUT table as unverified when the NUT provisioning data conflicts with the cross-connect provisioning data, when the NUT provisioning data received in the first direction conflicts with the NUT provisioning data received in the second direction, or when the parity data for the NUT provisioning data received in the first direction conflicts with the parity data for the NUT provisioning data received in the second direction.

27. The ring of claim 26, each node further operable to verify the master NUT table by accepting the master NUT table as verified when the NUT provisioning data matches the cross-connect provisioning data, the NUT provisioning data received in the first direction matches the NUT provisioning data received in the second direction, and the parity data for the NUT provisioning data received in the first direction matches the parity data for the NUT provisioning data received in the second direction.

* * * * *

UNITED STATES PATENT AND TRADEMARK OFFICE
CERTIFICATE OF CORRECTION

PATENT NO. : 6,950,409 B1
APPLICATION NO. : 09/846161
DATED : September 27, 2005
INVENTOR(S) : Jason P. Kettinger It is certified that error appears in the above-identified patent and that said Letters Patent is hereby corrected as shown below:

Column 2, Line 35, after "embodiments" insert -- of --.
Column 4, Line 36, after "element" delete "network".
Column 6, Line 52, after "processing" delete "idles" and insert -- idle --.
Column 9, Line 20, after "to" insert -- and --.
Column 11, Line 13, delete "updates" and insert -- update --.
Column 11, Line 56, after "processing" delete "idles" and insert -- idle --.
Column 12, Line 18, after "which" delete "the".
Column 17, Lines 34 and 35, after "for the node" insert -- , --.

Signed and Sealed this

Second Day of January, 2007

JON W. DUDAS
*Director of the United States Patent and Trademark Office*